UNITED STATES PATENT OFFICE.

JOHN W. LEE AND JOHN W. DAVIS, OF WASHINGTON, DISTRICT OF COLUMBIA.

IMPROVEMENT IN DISINFECTING COMPOUNDS.

Specification forming part of Letters Patent No. 145,433, dated December 9, 1873; application filed December 3, 1873.

*To all whom it may concern:*

Be it known that we, JOHN W. LEE and JOHN W. DAVIS, both of Washington City, and District of Columbia, have invented an Improved Disinfectant, of which the following is a full, clear, and exact description.

The object of our invention is to provide a simple and most effective deodorizing and disinfecting solution, and one which practical experience has demonstrated is equally valuable for disinfecting and destroying all offensive odor, whether the same be in connection with an animal or vegetable substance or matter. And while the well-known deodorizing and disinfecting substance, copperas, is a chief ingredient in our solution, we have found, by practical experiment in connection with sewers, sinks, ordinaries, water-closets, in sick rooms, and on dead bodies, that our solution is in every way more efficacious, not only in destroying odor but in purifying from infection, than is any other of the well-known compounds or solutions which have copperas as their basis.

The nature of our invention consists in employing, as a deodorizer and disinfectant, a solution consisting of water, copperas, alcohol, and saltpeter, and to which may be added the ordinary Prussian blue, or any other suitable coloring substance. When our solution is intended to be used in connection with a dead body, or in an apartment where the atmosphere has been poisoned by an infectious disease, the saltpeter can be most advantageously used in connection with the copperas and alcohol, but when applied to sewers, sinks, &c., or in connection with any animal matter, it is not at all essential.

To enable others to make and use our solutions, we will now give a formula for preparing the same.

When desired to be used in connection with dead bodies, or any other animal matter, to one (1) gallon of water we add four (4) ounces of copperas, five (5) ounces of saltpeter, and one quart of alcohol. For vegetable substances, to one (1) gallon of water we add eight (8) ounces of copperas, and two (2) gills of alcohol, and three (3) ounces of saltpeter, if desired, but it is not at all necessary, as a most rapid and effective action is produced without the saltpeter being employed. To these formulas may be added from one (1) to four (4) ounces of Prussian blue, or any other suitable coloring matter.

Now we wish it distinctly understood that, while the foregoing formulas are most admirably adapted for the purposes which they are respectively designed to effect, there is nothing arbitrary about the proportions hereinbefore stated, as these may be varied as the judgment of the operator may deem prudent, or occasion require, without at all affecting the principle of our invention.

Our solution has been most thoroughly tested in connection with disinterred bodies which have been buried for weeks, and in connection with corpses that have lain days in the water, and which, as all who are familiar with the purposes of our invention know, are the severest tests to which such agents can possibly be subjected, and has proven most successful, destroying instantaneously the most offensive odors resulting from decomposition, and without, in any manner, discoloring or eating, as it were, the corpse, and, as it is well known, a solution composed of copperas and water alone, invariably does, as do also all solutions or compounds of copperas and well-known acids.

What we claim as new, and desire to secure by Letters Patent of the United States, is—

A deodorizing and disinfecting solution, consisting of water, copperas, alcohol, either with or without saltpeter, substantially as described.

In testimony whereof we have signed our names to this specification in the presence of two subscribing witnesses.

JOHN W. LEE.
JOHN W. DAVIS.

Witnesses:
CHARLES WALTER,
F. S. WALSH, Jr.